United States Patent [19]
Gastgaber

[11] Patent Number: 5,614,411
[45] Date of Patent: Mar. 25, 1997

[54] SELF CONTAINED DECONTAMINATION SYSTEM

[76] Inventor: Charles Gastgaber, 26 Sunnyside Pl., Woodbridge, N.J. 07095

[21] Appl. No.: 516,748
[22] Filed: Aug. 18, 1995
[51] Int. Cl.⁶ .................................................. C12M 3/00
[52] U.S. Cl. ............................ 435/286.5; 4/222; 4/320; 210/206; 210/207; 210/610
[58] Field of Search ............................ 435/286.5; 4/222, 4/320; 210/195.1, 205, 206, 207, 610

[56] References Cited

U.S. PATENT DOCUMENTS

| | | | |
|---|---|---|---|
| 2,096,657 | 10/1937 | Vierra | 4/222 |
| 3,195,149 | 7/1965 | Carlson | 4/222 |
| 3,320,621 | 5/1967 | Vita | 4/222 |
| 3,557,388 | 1/1971 | Bach | 4/320 |
| 3,587,116 | 6/1971 | Quase | 4/320 |
| 3,665,521 | 5/1972 | Cooke | 4/320 |
| 3,713,177 | 1/1973 | Tuft et al. | 4/320 |
| 3,782,550 | 1/1974 | Materese | 210/206 |
| 4,904,387 | 2/1990 | Jordon | 210/605 |
| 4,996,055 | 2/1991 | Kurasawa | 424/442 |

*Primary Examiner*—David A. Redding
*Attorney, Agent, or Firm*—Peter Gibson

[57] ABSTRACT

Water borne human wastes contained in a holding tank of a self contained convenience facility are decomposed and thus decontaminated as well as deodorized by aqueous live bacteria delivered in a controlled laminar flow through flexible hose controlled by at least one valve from a reservoir of aqueous live bacteria held in a supply container. A flexible, sealed supply container or an open, rigid container having an air inlet is recommended. In addition, a flow meter having communication with this flow, specifically a drip chamber, also recommended. Two valves, one above the flow meter, the other below, is suggested in use with a drip chamber. A spigot attached to the supply outlet is specifically recommended as an upper valve and a simple constriction device which partially constricts the lumen of a length of the hose below the drip chamber is specifically recommended for the lower valve.

20 Claims, 4 Drawing Sheets

SELF CONTAINED DECONTAMINATION SYSTEM

BACKGROUND OF THE INVENTION

1. Field of the Invention

The general field of the present invention is decontamination, more particularly decontamination of water borne human wastes contained in a holding tank, specifically a holding tank that is part of a self contained convenience facility which allows people to relieve themselves of bodily wastes.

2. General Background

The disposal of human wastes in the United States is broadly and generally conducted with sewage systems including large scale open vats wherein certain bacteria are fostered to decompose the wastes into environmentally benign effluent. It is with this sense that the phrase 'decontamination of human wastes' is herein utilized. ' Disposal of human wastes', as understood herein, indicates delivery of the wastes to a common sewage system.

The practice by conventional sewage systems of using certain bacteria in association with open vats of sewage developed historically in a relatively poorly understood facilitaion of naturally occurring phenomena which recently has become better understood. Specific bacteriums are now produced in large quantity and, in an aqueous medium, pumped into open systems to facilitate more effective decontamination of the human wastes in sewage. Decontamination of human wastes is a primary concern of conventional sewage plants.

The concerns relating to the wastes in holding tanks of self contained convenience facilities, alternatively, have been limited to that of rendering the wastes relatively inoffensive to the users of the facilities and simple disposal of the contents of the holding tank. Pursuit of these two objectives has led to the use of holding tanks which are sealed except during the brief interval required to flush wastes from an auxiliary basin above the holding tank into the same. The basin typically comprises a cover to the holding tank and the exterior surface of the basin is rinsed with a stream of water while the cover is inclined inward into the tank. This action constitutes flushing of such a facility. The holding tank is easily removed from the facility and easily emptied.

Formaldehyde is extremely effective in rendering the wastes relatively inoffensive to human olfactory senses and the use of it, in conjunction with a facility having a normally sealed holding tank of the type described immediately above, has endured through decades, to the present. The instant invention is not concerned with conventional sewage systems but with the decontamination of human wastes deposited into holding tanks in what is described herein as a self contained convenience facility of the type provided in a train carriage, an airplane, a portable type convenience booth, etc. which commonly utilize holding tanks, the contents of which are commonly treated with formaldehyde.

Statement of Need

Formaldehyde is a persistent, toxic substance which does not break down readily and is now generally considered toxic with regard to disposal in public sewage systems and hence impedes proper disposal of the human wastes contained in the holding tanks of self contained convenience facilities. Other agents utilized in such holding tanks similarly fail to effect decontamination of the human wastes held and constitute an additional toxic disposal problem. Hence a need exists for rendering inoffensive to human olfactory senses the human wastes held in a storage tank of a self contained convenience facility which does not pose an additional toxic disposal problem and does not impede the proper disposal and subsequent decomposition of the human wastes.

SUMMARY OF THE INVENTION

Objects of the Invention

One objective of the instant invention is a system for rendering inoffensive to human olfactory senses the water borne human wastes held in a holding tank of a self contained convenience facility without introduction of any additional toxic substances to said holding tank.

The encompassing objective of the instant invention is a system for the decontamination of the water borne human wastes held in a holding tank of a self contained convenience facility without introduction of any additional toxic substances to said holding tank.

A further benefit of the instant invention is a system for decontamination of the water borne human waste contained in a holding tank of a self contained convenience facility to a degree that the water bearing the decontaminated human waste is environmentally benign.

Principles Relating of the Instant invention

The above stated objectives of the instant invention may be fulfilled by adherence to the principles outlined forthwith. A substantial quantity of at least one known bacterium in an aqueous medium which effectively and completely decomposes water borne human wastes, herein referred to as aqueous live bacteria, is delivered to a holding tank in a steady, controllable rate of flow through a closed system from the outlet of a supply container to a holding tank of a self contained convenience facility.

A reservoir of the aqueous live bacteria are maintained alive in the supply container held elevationally superior to, ie. above, the holding tank. The container possesses a supply outlet possessing communication with the continuous sealed interior cavity of a length of hose, herein known as a lumen, and allows gravity induced laminar flow therethrough. A flow meter enabling a determination of the rate of this flow may be additionally located along the length of hose as may a second valve. If two valves are utilized, one is located above the flow meter and the second below the same.

In preferred embodiments of the principles according to the present invention, the supply container is comprised of either a sealed flexible container or a relatively rigid container possessing an air inlet. Furthermore, the preferred type of flow meter comprises a drip chamber possessing an enclosed interior sealed and in communication with the lumen of the length of hose extending from the reservoir to the holding tank. This drip chamber possesses a transparent portion allowing visual observation of the drops of aqueous live bacteria which form at a lower orifice of an upper length of hose possessing communication with the inside and of the drip chamber and which collect in the bottom interior of same. An upper orifice of a lower length of hose possesses communication with the bottom interior of the chamber enabling flow of said aqueous live bacteria from said chamber to a lower orifice which is placed in communication with the interior of said holding tank. The flow of aqueous live bacteria from the drip chamber to the holding tank is preferably controlled by a second valve further preferably consisting of a constriction device which partially constricts the lumen of a portion of the lower length of hose.

The entire system is sealed with respect to the flow of the aqueous live bacteria from the supply outlet to the lower orifice of the hose in communication with the interior of the holding tank. The reservoir of aqueous live bacteria is disposed elevationally superior to said drip chamber during initiation of flow to the same and said drip chamber is disposed elevationally superior to said lower orifice in communication with the interior of said holding tank during initiation of flow to the same. Since the supply outlet is maintained above this lower orifice and the flow from the outlet to the lower orifice is through a closed system, gravi will suffice to maintain said flow once commenced. In order to facilitate rapid commencement of flow through the system, it is recommended that the valve controlling the rate of flow from the reservoir outlet pretrably comprise a spigot attached to said reservoir to which a length of hose is readily attached in condition wherein said supply outlet is in sealed communication with the upper orifice of the hose.

Aqueous live bacteria is thus delivered from a reservoir to the holding tank of a self contained convenience facility by gravity in a controllable laminar flow through a closed system requiring, in a preferred embodiment of the principles relating to the present invention, only two moving components: one in the spigot and one in the constriction device. Given an adequate supply of aqueous live bacteria relative to the quantity of human waste deposited in the holding tank and a suitable rate of flow of said bacteria to the same, complete decomposition of the water borne human wastes in said tank is effected without the addition of any toxic substance. This decomposition further renders the water held in the tank free of offensive odors and, barring the presence of other contaminants, further renders the contents of the holding tank ale contaminated by this system environmentally benign.

A fuller appreciation of the practical operation of a system in accordance with the principles relating to the instant invention outlined above may be attained with reading of the detailed description below with reference to the drawings attached hereto.

DETAILED DESCRIPTION OF THE INVENTION

Figure 1:
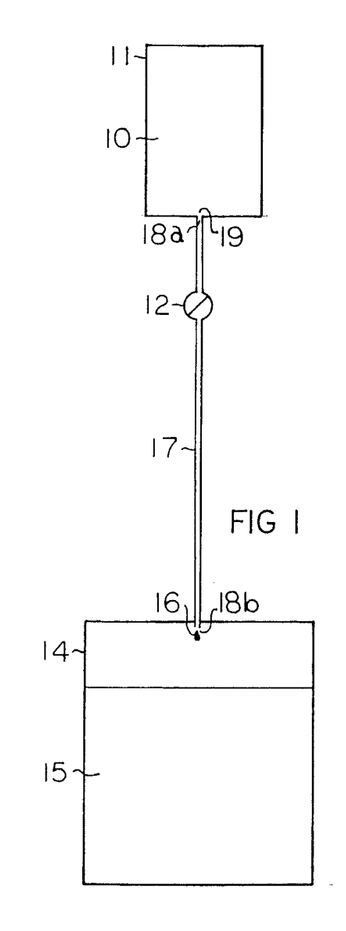
FIG. 1 is a schematic representing a alecontamination system in accordance with the principles relating to the present invention utilizing a supply container, one valve and one length of hose.
Figure 2:
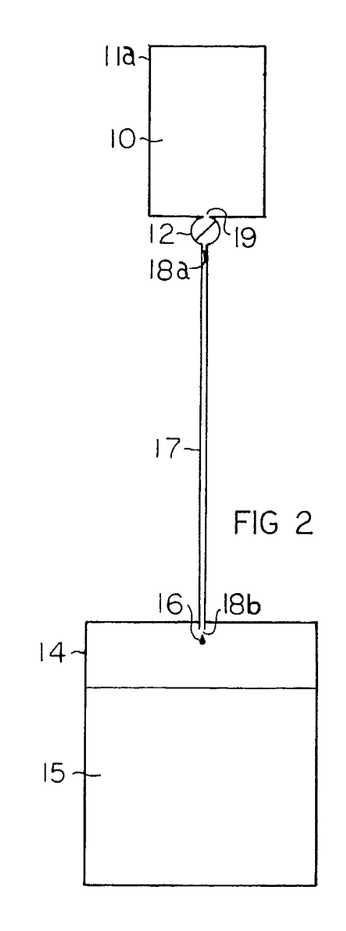
FIG. 2 is a schematic representing a decontamination system in accordance with the principles relating to the present invention utilizing a sealed supply container, one valve attached to the supply outlet and one length of hose.
Figure 3:
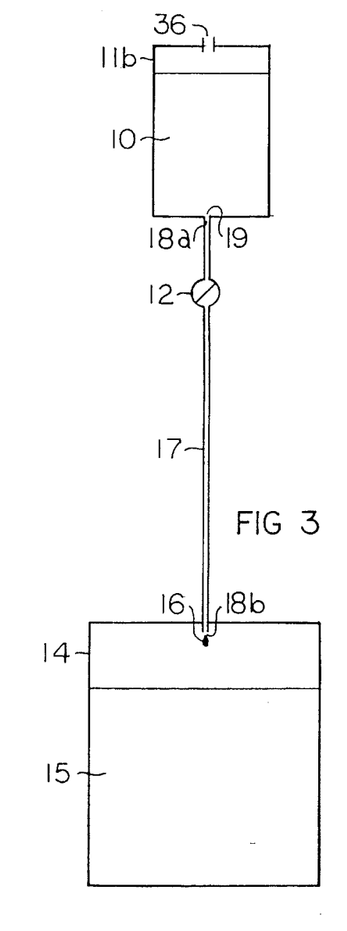
FIG. 3 is a schematic representing a alecontamination system in accordance with the principles relating to the present invention utilizing a rigid supply container with an air inlet, one valve and one length of hose.

FIGS. 1–3 each depict a simple system for delivery of aqueous live bacteria 10 to the water borne human wastes 15 held in a holding tank 14 of a self contained convenience facility. A reservoir of aqueous live bacteria 10 is held in a supply container 11 disposed elevationally superior to, ie. above, the holding tank 14. A hose 17, ie. a flexible tube possessing a continuous interior cavity of substantially uniform diameter herein known as a lumen which possesses two opposed openings, herein known as orifices 18, extends from the bottom of the supply container 11 to the interior of a holding tank 15. An upper orifice 18a possesses communication with the interior of the supply container 11, the lower orifice 18b, possesses communication with the interior of the holding tank 14, either directly, in attachment to the supply outlet 19, as seen in FIGS. 1 & 3, or indirectly, through a valve 12 attached to the supply outlet 19 as seen in FIG. 2.

The hose 17 passes through some means of manually controlling the rate of flow of a liquid through the hose 17 hereinafter known as a valve 12. Proper regulation of the valve 12 will enable continuous laminar flow of aqueous live bacteria 10 from the supply container 11 through the hose 17 into the holding tank 14 containing the water borne human wastes 15. The supply container 11a depicted in FIG. 2 is sealed except for the supply outlet 19, as discussed more fully below. The supply container 11b depicted in FIG. 3 possesses an air inlet 36 which facilitates flow if the supply container 11 is of a construction which is rigid with respect to atmospheric pressure.

The interior diameter of the hose 17 is small enough to ensure laminar flow of the aqueous live bacteria 10 between the two orifices 18 given a supply container 11 full of aqueous live bacteria 10 and the elevational difference, ie. elevational head, expected in use as a decontamination system for a self contained convenience facility. The full condition of the supply container 11 possesses the greatest elevational fluid head for gravity feed which drives the flow.

If the supply container 11 is sealed except with respect to one supply outlet 19 located proximate the bottom, said container must have flexible walls and is further preferably made of a food grade quality plastic as is the hose 17. This construction effectively reduces the elevational head associated with an open system to what is often referred to as a system driven by atmospheric pressure. Atmospheric pressure is necessary, in opposition to the gravity induced evacuation of fluid from the container, to collapse the walls of a sealed supply container 11a.

Figure 4:
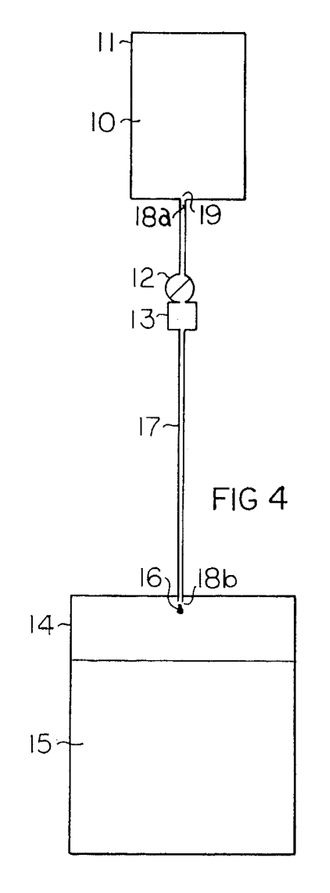
FIG. 4 is a schematic representing a alecontamination system in accordance with the principles relating to the present invention utilizing a supply container, one valve combined with a flow meter and one length of hose.
Figure 5:
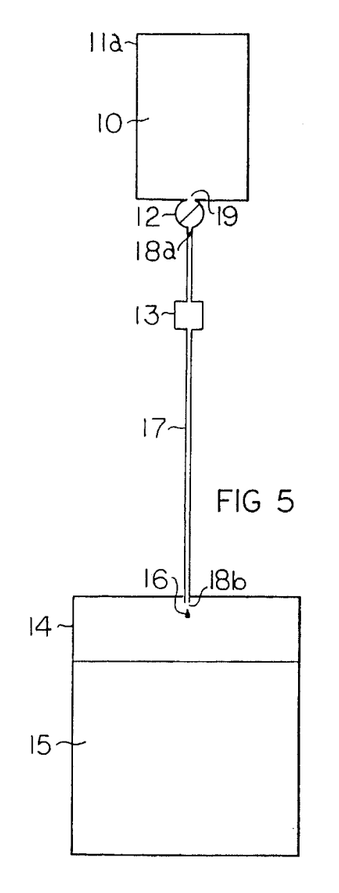
FIG. 5 is a schematic representing a alecontamination system in accordance with the principles relating to the present invention utilizing a sealed supply container, one valve attached to the supply outlet, a flow meter and one length of hose.
Figure 6:
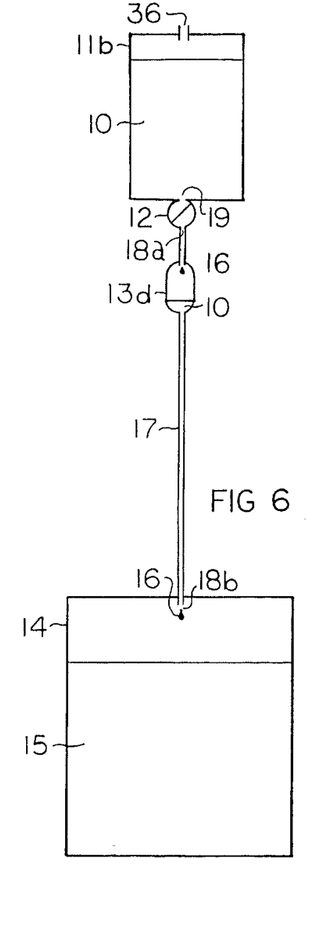
FIG. 6 is a schematic representing a decontamination system in accordance with the principles relating to the present invention utilizing a rigid supply container with an air inlet, one valve attached to the supply outlet, a flow meter consisting a drip chamber and one length of hose.

FIGS. 4–6 each depict a system for delivery of aqueous live bacteria 10 to the water borne human wastes 15 held in a holding tank 14 similar to the basic system represented in FIGS. 1–3 but also utilizing a flow meter 13. The flow meter 13 depicted in FIGS. 4 & 5 may be of any sort which yields an indication to an operator of the rate of flow of aqueous live bacteria 10 through the hose 17. The flow meter 13 therefore either measures the rate of this flow or simply enables one to determine what the rate of flow is, approximately. The preferred flow meter 13d, depicted in FIG. 6, consists of a drip chamber which is discussed in detail below. FIG. 4 depicts a flow meter 13 combined with a valve 12, FIG. 5 depicts a generic flow meter 13 separate from the valve 12 which, in this case, is also attached directly to the supply outlet 19. FIG. 5 also depicts utilization of a sealed supply container 11a while FIG. 6 depicts utilization of an open, rigid, supply container 11b which has an air inlet 36.

Figure 7:
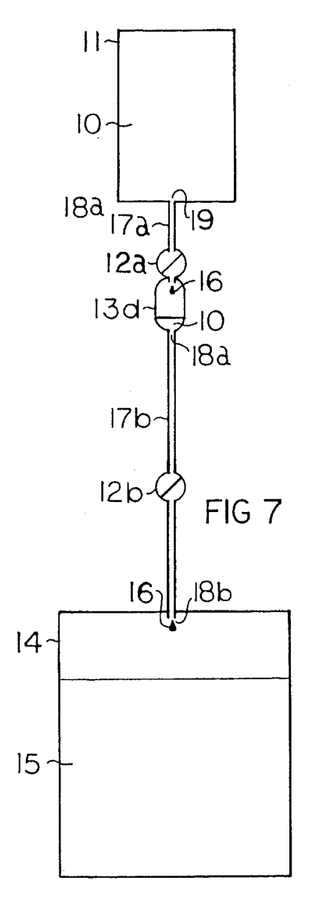
FIG. 7 is a schematic representing a alecontamination system in accordance with the principles relating to the present invention utilizing a supply container, one valve combined with a flow meter consisting of a drip chamber, a second valve and two lengths of hose.
Figure 8:
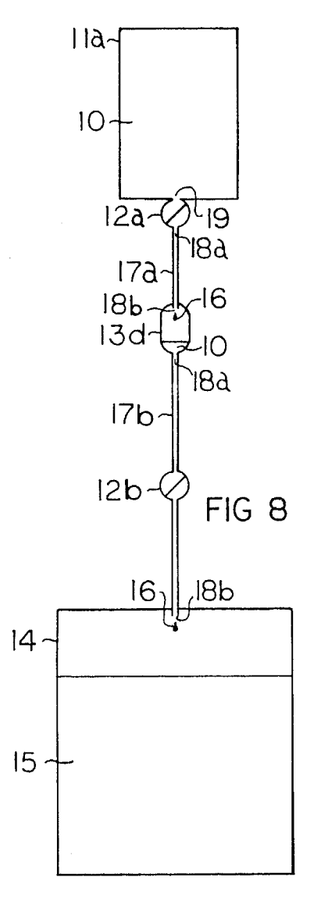
FIG. 8 is a schematic representing a decontamination system comprising a preferred embodiment of the principles relating to the present invention utilizing a sealed supply container, one valve attached to the supply outlet, a drip chamber, a second valve and two lengths of hose.
Figure 9:
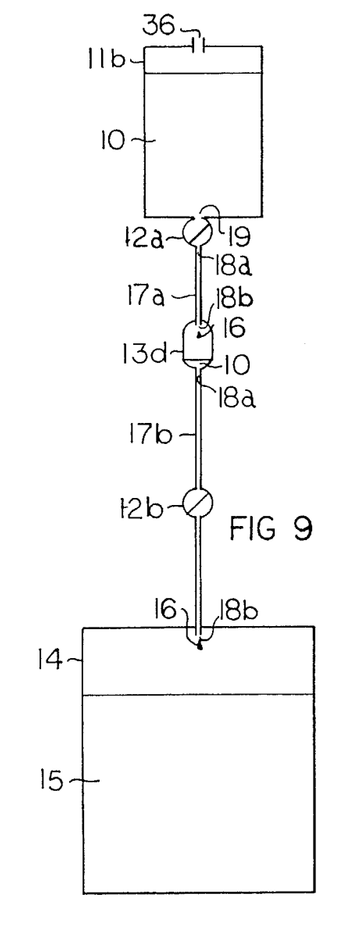
FIG. 9 is a schematic representing a alecontamination system comprising a preferred embodiment of the principles relating to the present invention utilizing a rigid supply container with an air inlet, one valve attached to the supply outlet, a drip chamber, a second valve and two lengths of hose.

FIGS. 7–9 represent preferred systems for decontamination of the water borne human wastes 15 in a holding tank 14 of a self contained convenience facility further utilizing two valves 12: an upper valve 12a above the flow meter 13 and a lower valve 12b positioned below the flow meter 13, both positions being with respect to the flow of aqueous live bacteria 10 from the supply container 11 to the holding tank 14. FIG. 7 depicts an upper valve 12a combined with the flow meter 13. The flow meter 13 depicted is a drip chamber 13d and the supply container 11 is of any type. FIGS. 8 & 9 represent preferred systems similar to that depicted in FIG. 7 but specifically utilizing a valve 12 in communication with the supply outlet 19 of the supply container 11 and further particularized as utilizing either a sealed supply container 11a or an open supply container 11b having an air inlet 36. Both systems also use a drip chamber 13d as the preferred type of flow meter 13. A sufficiently low flow rate of aqueous live bacteria 10 through a length of hose 17 will result in drops 16 of aqueous live bacteria 10 forming at a lower orifice 18b of the same. The drip chamber 13d comprises a rigid walled enclosed vessel with an interior in communication with both the lower orifice 18b of an upper length of hose 17a and the upper orifice 18a of a lower length of hose 17b. The upper length of hose 17a possesses an upper orifice 18a in communication with the supply outlet 19 of the supply container 11 and the bottom length of hose 17b possesses a lower orifice 18b in communication with the interior of the holding tank 14.

Figure 11:
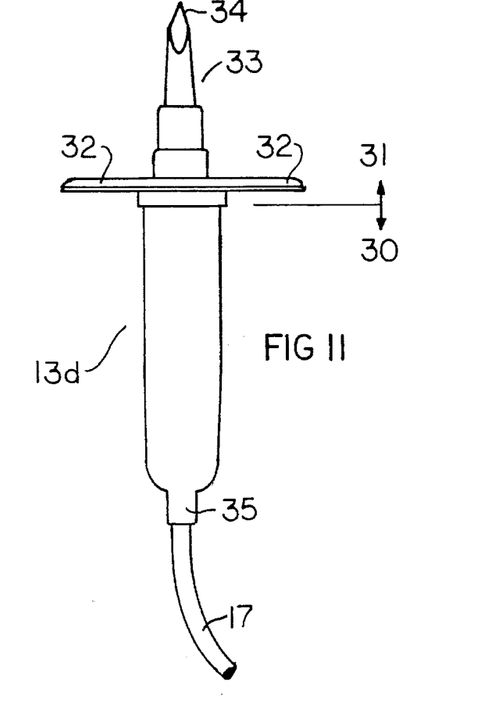
FIG. 11 is a plain elevational view illustrating the construction of the preferred flow meter represented in FIGS. 6–9 consisting of a drip chamber.

Drips 16 of aqueous live bacteria 10 are depicted falling from a lower orifice 18b of a length of hose 17 into the water borne human wastes 15 held in a storage tank 14 in all the systems represented in the drawings attached hereto: FIGS. 1–9. As represented in FIGS. 6, 8 & 9, drips are seen falling from the lower orifices 18b of both an upper length of hose 17a at the top of a drip chamber 13d and a lower length of hose 17b disposed interior to the holding tank 14. The drip chamber 13d has a translucent portion through which visual inspection of the frequency of the dripping may be made, thereby facilitating determination of an appropriate flow rate of aqueous live bacteria 10 from the supply container 11 to the holding tank 14. Preferably, the entire lower portion 30 of the drip chamber 13d is molded of a clear plastic, as depicted in FIG. 11. This facilitates monitoring of the level of the collected drips of aqueous live bacteria 10 which forms at the bottom interior of the drip chamber 13d. Other preferred aspects of the drip chamber 13d regarding construction which facilitate implementation are discussed below. The preferred embodiments of the principles relating to the present invention represented in FIGS. 7–9 also include an upper valve 12a for controlling the rate of flow of aqueous live bacteria 10 from the supply outlet 19 of the supply container 11 through the upper length of hose 17a to the drip chamber 13d. Preferred aspects of this upper valve 12a and of the lower valve 12b which controls the rate of flow of aqueous live bacteria 10 from the drip chamber 13d through the lower length of hose 17b are also both described in further detail below.

With regard to the systems of decontaminating the water borne human wastes 15 contained in a holding tank 14 represented in FIGS. 6, 8 & 9 as opposed to the simpler embodiments of the principles relating to the present invention represented in FIGS. 1–3, it is observed that the introduction of the drip chamber 13d enables visual determination of the flow rate of aqueous live bacteria 10 which otherwise is relatively invisible because the lower orifice 18b of the hose 17 possessing communication with the interior of the holding tank 14 is concealed from sight in a typical application and because a sealed supply container 11b possessing flexible walls to provide continuous laminar flow may be utilized. This latter aspect effectively denies any gaseous bubbles formed by cavitation, entrainment or entrance through the lower orifice 18b possessing communication with the interior of the holding tank 14 from traveling counter the flow of aqueous live bacteria 10 which would yield a visual indication of flow rate if a rigid walled supply container 11b is utilized.

The drip chamber 13d therefore functions simply as a means of enabling a determination of the rate of flow of the aqueous live bacteria 10 and may readily be replaced by any other such means, herein termed a flow meter 13, as depicted in FIGS. 4, 5 & 7. The fact that the drip chamber 13d enables such a determination by facilitating the visual observation of the rate of drop formation essentially introduces a spatial attenuation of the continuous laminar flow of aqueous live bacteria 10. The flow is still laminar and the system is closed with respect to the flow from the supply outlet 19 to the holding tank 14, but the flow through the drip chamber 13d includes flow which is through an enclosed gaseous atmosphere. Drops 16 collect to form a pool of aqueous live bacteria 10 at the bottom interior of the drip chamber 13d and the elevational head associated with the height difference between the supply outlet 19 of the supply container 11 and the lower orifice 18b possessing communication with the interior of the holding tank 14 is thus further complicated.

In one sense, the drip chamber 13d divides the overall elevational head between the supply container 11 and the holding tank 14 into two portions; the lower orifice 18b of the upper length of hose 17a must be elevationally inferior to the supply outlet 19 of the supply container 14 and the upper orifice 18a of the lower length hose 17b possessing communication with the interior of the drip chamber 13d must be elevationally superior to the lower orifice 18b of said lower length of hose 17b. The aqueous live bacteria 10 collected in the interior bottom of the drip chamber 13d thus functions, in a non-equilibrium state of flow, as an elevational head separate from the elevational head obtaining from the supply outlet 19 and the lower orifice 18b of the upper length of hose 17a. This aspect suggests the use of two separate valves 12, each controlling the rate of flow through separate portions of the system which functionally possess separate elevational heads during the commencement of flow through each respective portion.

However, once flow is established throughout the system, said system is closed, whether a sealed flexible container 11a or a rigid container 11b having an air inlet is utilized. The flow of aqueous live bacteria 10 through the hose 17 and any associated flow meter 13 or valve 12 comprising any system in accordance with the principles relating to the present invention, including utilization of a drip chamber 13d comprises flow through a closed system. This is because the drip chamber 13d contains a trapped gaseous environment once flow of aqueous live bacteria 10 through the entire system is established and portions of the hose 17 above and below the drip chamber 13d are the same with regard to the pressure differential obtaining in this system. The physical laws governing gravity induced flow through a closed system dictate that a continuous pressure differential exist throughout the system. This pressure differential continuum regulates the flow through the two portions of the hose 17 in a manner which is readily demonstrated by a consideration of the limiting cases.

If the rate of flow through the upper length of hose 17a exceeds the rate of flow through the lower length of hose 17b, as is initially the case in the commencement of flow, the volume of aqueous live bacteria 10 collected in the drip chamber 13d increases. Once continuous flow through the lower length of hose 17b is established, however, the gaseous atmosphere in the drip chamber 13d is trapped and any further increase in the volume of aqueous live bacteria 10 held in the bottom interior of the drip chamber 13d entails a corresponding diminishment in volume for the same amount of trapped gaseous atmosphere to occupy. Therefore, the pressure in the drip chamber increases with an increase in the level of the aqueous live bacteria 10 in the drip chamber 13d. This causes an increase in back pressure upon flow through the upper length of hose 17a, slowing the rate of said flow, and the same increase in pressure constitutes an increase in the head pressure acting upon the flow through the lower length of hose 17b, thus increasing the rate of this flow. Alternatively, if the rate of flow in the lower length of hose 17b exceeds that of the rate of flow through the upper length of hose 17a, the pressure upon the trapped atmosphere in the drip chamber 13d will decrease and act to slow the rate of flow below while increasing the rate of flow above.

Thus any difference between the two rates of flow result in a pressure change within the trapped gaseous atmosphere within the drip chamber 13d which alters the rate of both flows towards an equilibrium condition. This inherent regulation provided by the drip chamber 13d upon the respective rates of flow through the upper and lower lengths of hose 17 absolutely ensures that said two rates will be equivalent under an equilibrium condition. Furthermore, an equilibrium condition will necessarily obtain after a certain length of time and this equilibrium condition will be readily recognizable as indicated by stability in the level of aqueous live bacteria 10 within the drip chamber 13d.

This inherent physical bias towards an equilibrium condition between the flows through the upper and lower lengths of hose 17 separated by the drip chamber 13d also renders one of the two valves 12 represented in FIG. 2 unnecessary for maintenance of the continuous flow of aqueous live bacteria 10 from the supply container 11 to the holding tank 14 which is essential to an embodiment in accordance with the principles relating to the present invention. In other words, only one valve 12 will suffice even in a system using a drip chamber 13d as a means of controlling the rate of aqueous live bacteria 10 flow, as depicted in FIG. 6. The principle reasons for two valves 12 being given in the preferred embodiments represented in FIGS. 8 & 9 are concerned with aspects of the system in typical practice.

In practice the supply container 11, when full, contains a substantial volume. Five gallons is a typical value. Upon a container of this size it is desirable to have a spigot 20, such as that depicted in FIG. 10, attached to and in communication with the relatively large supply outlet 19 of such a container. This enables a relatively large initial rate of flow of aqueous live bacteria 10 through the system. Conversely, it is desirable to have a constriction device 37, such as that depicted in detail in FIG. 12, comprise the lower valve 12b as represented in FIGS. 7–9. In setting up a system in accordance with the principles relating to the present invention, the supply container 11 is disposed above the holding tank 14 of a self contained convenience facility, the lower orifice 18b of the hose 17 is placed in communication with the upper portion of the interior of the holding tank 14 and flow of aqueous live bacteria 10 is commenced. In order to reduce the time required to achieve a continuous steady flow, it is desirable that a relatively large rate of flow be used initially which is facilitated by opening the spigot 20 with the constriction device 37 in an open position wherein the lumen of the hose 17 is free of constriction.

Once continuous flow to the holding tank 14 has been established the spigot 20 and the constriction device 37 are adjusted to obtain a desirable flow rate as measured by the frequency of the dripping, ie. the rate of drop 16 formation, observed in the drip chamber 13d. The spigot 20 regulates flow of aqueous bacteria 10 through a spigot outlet 26 possessing a cross sectional area that exceeds the cross sectional area possessed by the lumen of the hose 17. Unlike the spigot 20, however, the constriction device 37 operates upon the lumen of the flexible hose 17 and does not require an effectively closed state. Said constriction device 37 is, consequently, able to provide a degree of sensitivity in control of the flow which is inherently lacking in the spigot 20. Thus the constriction device 37, located upon the lower length of hose 17b and comprising the lower valve 12b depicted in FIGS. 7–9, acts in conjunction with the spigot 20 comprising the upper valve 12a depicted in FIGS. 8 & 9 to provide, effectively, a relatively sensitive vernier adjustment in control of the flow of aqueous live bacteria 10 through the hose 17. A single valve 12 possessing the flow capacity of the spigot 20 and the sensitivity of the constriction device 37 is necessarily more expensive than the extremely simple, inexpensive spigot 20 and constriction device 37 recommended, as will become apparent in the detailed description of these devices following.

Figure 10:
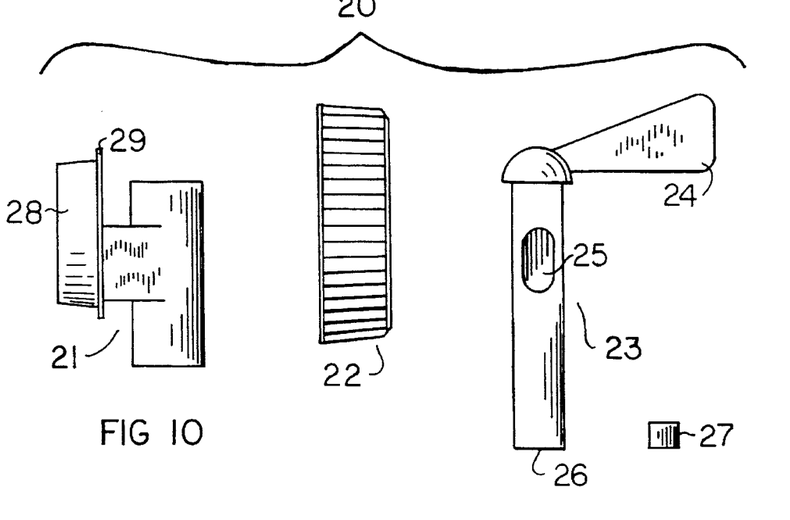
FIG. 10 is an explosion view illustrating the preferred construction of the upper valve attached to the supply outlet represented in FIGS. 8 & 9 consisting of a spigot.

FIG. 10 illustrates a spigot 20 comprising a preferred form of the upper valve 12a represented in FIGS. 8 & 9 consisting of a spigot body 21, a threaded collar 22 and a rotatable member 23 which possesses a handle 24 and an inlet 25. A reduction sleeve 27 is also shown as an ancillary component which is made of a resilient material and possesses an exterior diameter substantially equivalent to the inner diameter of the spigot outlet 26 and an interior diameter substantially equivalent to the exterior diameter of the hose 17 utilized. The spigot body 21 illustrated in FIG. 10 has a tapered flange 28 which fits snugly into the relatively large supply outlet 19 of the supply container 11 which is not illustrated in detail.

This tapered flange 28 comprises an embrasure extending into the supply outlet 19 and is biased into a sealed condition with same by tightening the threaded collar 22 onto a threaded exterior diameter of the supply outlet 19 which action exerts uniform pressure upon the exterior face of the smaller flat flange 29 of the spigot body 21 which is perpendicular the tapered flange 28. The spigot body 21 has a medial hollow section which extends outward through the threaded collar 22 and ends in juncture with a vertically disposed cylindrical portion. This juncture possesses an aperture approximately the same size and shape of the spigot inlet 25 possessed by the rotatable member 23 which extends through this cylindrical portion of the spigot body 21. The rotatable member 23 possesses a handle 24 extending outward from the cylindrical portion of the spigot body 21 facilitating manual rotation of the same which action selectively positions the spigot inlet 25 with respect to the above mentioned aperture in order to control flow therethrough. The rotatable member 23 is basically cylindrical below the juncture with the handle 24 and possesses a substantially uniform bore open to the bottom which comprises the spigot outlet 26 into which the reduction sleeve 27 is disposed as mentioned above.

The upper length of hose 17a fitted into the spigot outlet 26 has an upper orifice 18a held within said outlet 26 and a lower orifice 18b which is placed in communication with the interior of the drip chamber 13 in the preferred embodiments of the principles relating to the present invention represented in FIGS. 6, 8 & 9. A detailed illustration of a suitable drip chamber 13d is given in FIG. 11. This drip chamber 13d is comprised of a lower section 30 and an upper section 31, the latter possessing a pair of wings 32 and a rigid, bored, upward extension 33 which terminates in a beveled tip 34.

In practice, the lower end of the upper length of hose 17a is held in one hand while the other hand grasps the drip chamber lower section 30 and thrusts the beveled tip 34 of the rigid upward extension 33 of the drip chamber upper section 31 into the lower orifice 18b. The rigid upward extension 33 possesses a tapered exterior which effects a fight seal against the lumen of the flexible hose 17 and securely attaches the two together. The wings 32 extending in opposed directions perpendicularly to the main axis of the drip chamber 13d provide a convenient surface for the hand grasping the lower section 30 to exert the necessary force required for penetration of the rigid upward extension 33 into the lower orifice 18b which action expands the affected portion of the hose 17 in order to obtain secure frictional attachment.

The drip chamber upper portion 31 is preferably comprised of a relatively rigid plastic which may be opaque while the lower section 30 is preferably made of a transparent plastic which may be relatively resilient though still rigid with respect to atmospheric pressure. The two sections must be attached to form a sealed interior cavity possessing communication with the bore of the rigid upward extension 33 of the upper section 30 and the upper orifice 18a of the lower length of hose 17b which is preferably cemented or welded into the downward oriented nipple 35 at the bottom of the lower section 31 thereby providing a sealed and fastened juncture between the upper end of the lower length of hose 18b and the interior of lower section 30.

Figure 12:
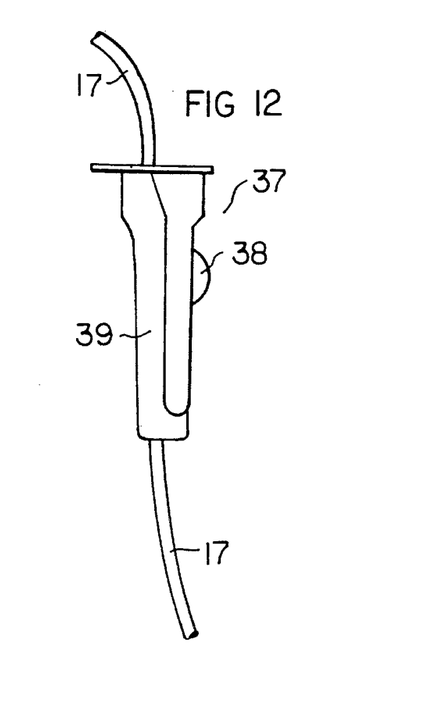
FIG. 12 is a plain elevational view illustrating a preferred construction of the lower vane represented in FIGS. 7–9 consisting of a constriction device.

FIG. 12 illustrates a preferred type of constriction device 37 comprising the lower valve 12b of the preferred embodiment of the principles relating to the present invention represented in FIGS. 6, 8 & 9. This constriction device 37 consists simply of a molded plastic frame 39 and a knurled wheel 38, also preferably a molded plastic component, both further preferably molded of a relatively rigid, opaque plastic. The knurled wheel 38 possesses a short spindle extending from both sides which engages a longitudinal track molded into the interior of the frame 39 which is open at the upper end as depicted. The wheel 38 is placed into this open end of the track and the lower length of flexible hose 17b is fed through the frame 39, trapping the wheel 38, and disposed along an interior wall of the same which is apposed to and possesses a gradual inclination with respect to the longitudinal track. The wheel 38 is simply trapped but does not impinge upon the hose 17 when positioned near the open end of the frame 39. Pushed down, towards and into contact with the length of hose 17 held in the frame 38, the wheel is readily engaged frictionally with a resilient hose 17 and rotated in the track, climbing the inclined length of hose 17 trapped in the frame 39, thereby effecting a gradual compression of said hose 17, constricting the lumen of the same.

The spigot 20, drip chamber 13d and constriction device 37 of the type described above and illustrated in FIGS. 10–12 are each, in and of themselves, components which may be readily purchased upon the current market. None of the particulars of any of these three devices is claimed as novel in the instant document. The utilization of these particular components in a system delivering aqueous live bacteria 10 to a holding tank 14 of a self contained convenience facility is, however, considered novel and is claimed herein. The aqueous live bacteria 10 which is preferably employed currently comprises a proprietary product of Sunnyside Products Inc. of Woodbridge, N.J. known as TKO Bacterial Odor Destroyer which contains viable bacterial cultures which effectively degrade, ie. decompose, human wastes into olfactorily inoffensive and environmentally benign components.

The proceeding discussion is intended to describe in detail the manner considered best by the inventor of making and using an embodiment of the principles relating to the present invention and may not be interpreted as being in any manner restrictive of the scope of the intellectual property nor the rights and privileges granted by Letters Patent securing the same for which I hereby claim.

I claim:

1. A system for decontaminating water borne human wastes in the holding tank of a self contained convenience facility, said system comprising:

a reservoir of aqueous live bacteria capable of decomposing water borne human wastes, including solid wastes, into olfactorily inoffensive and environmentally benign constituents, said reservoir being held in a supply container possessing a supply outlet connected to at least one length of hose and a valve;

each said length of hose possessing a continuous lumen between two opposed orifices, each said orifice comprising an opening of said lumen, one said orifice of one said length of hose comprising an upper orifice possessing communication with said supply outlet;

said reservoir being disposed elevationally superior to a holding tank containing water borne human wastes and said valve being operationally connected to at least one said length of hose, each said length of hose and said valve together comprising a closed system between upper said orifice of one said length of hose possessing communication with said supply outlet and a lower orifice of one of said lengths of hose;

placement of said lower orifice of one of said lengths of hose into communication with the interior of said holding tank and suitable control of said valve thereby enabling gravity induced delivery of aqueous live bacteria from said reservoir in a continuous laminar flow through said closed system to said interior of said holding tank thereby effecting decontamination of the water borne human wastes contained therein by decomposition of said wastes into olfactorily inoffensive and environmentally benign constituents by the live aqueous bacteria so delivered.

2. A system for decontaminating water borne human wastes in the holding tank of a self contained convenience facility in accordance with claim 1 wherein said supply container is sealed except for said supply outlet and said container is collapsible by the evacuation of fluid contents in opposition to atmospheric pressure.

3. A system for decontaminating water borne human wastes in the holding tank of a self contained convenience facility in accordance with claim 1 wherein said supply container is rigid with respect to atmospheric pressure and further possesses an air inlet.

4. A system for decontaminating water borne human wastes in the holding tank of a self contained convenience facility in accordance with claim 1 wherein said valve possesses communication with said supply outlet and only one said length of hose is utilized.

5. A system for decontaminating water borne human wastes in the holding tank of a self contained convenience facility in accordance with claim 1 wherein said valve is disposed between an upper length of hose and a lower length of hose, said upper length of hose possessing an upper orifice possessing communication with said supply outlet and a lower orifice communication with said valve, said lower length of hose possessing an upper orifice possessing communication with said valve.

6. A system for decontaminating water borne human wastes in the holding tank of a self contained convenience facility, said system comprising:

a reservoir of aqueous live bacteria capable of decomposing water borne human wastes, including solid wastes, into olfactorily inoffensive and environmentally benign constituents, said reservoir being held in a supply container possessing a supply outlet connected to a flow metering device, at least one length of hose and at least one valve;

each said length of hose possessing a continuous lumen between two opposed orifices, each said orifice comprising an opening of said lumen, one said orifice of one said length of hose comprising an upper orifice possessing communication with said supply outlet;

said reservoir being disposed elevationally superior to a holding tank containing water borne human wastes and each said valve being operationally connected to at least one said length of hose, each said length of hose, each said valve and said flow metering device together comprising a closed system between said upper orifice of one said length of hose possessing communication with said supply outlet and a lower orifice of one of said lengths of hose;

said metering device enabling a determination of the rate of flow through said closed system;

placement of said lower orifice of one of said lengths of hose into communication with the interior of said holding tank and control of each said valve in accordance with a determination of a suitable flow rate of aqueous live bacteria enabled by said metering device thereby enabling gravity induced delivery of aqueous live bacteria from said reservoir in a continuous laminar flow through said closed system to said interior of said holding tank thereby effecting decontamination of the water borne human wastes contained therein by decomposition of said wastes into olfactorily inoffensive and environmentally benign constituents by the live aqueous bacteria so delivered.

7. A system for decontaminating water borne human wastes in the holding tank of a self contained convenience facility in accordance with claim 6 wherein said supply container is sealed except for said supply outlet and said container is collapsible by the evacuation of fluid contents in opposition to atmospheric pressure.

8. A system for decontaminating water borne human wastes in the holding tank of a self contained convenience facility in accordance with claim 6 wherein said supply container is rigid with respect to atmospheric pressure and further possesses an air inlet.

9. A system for decontaminating water borne human wastes in the holding tank of a self contained convenience facility in accordance with claim 6 wherein one said valve possesses communication with said supply outlet and said flow meter possesses communication with both a lower orifice of one said length of hose and an upper orifice of another said length of hose.

10. A system for decontaminating water borne human wastes in the holding tank of a self contained convenience facility in accordance with claim 6 wherein said flow meter consists of a drip chamber rigid with respect to atmospheric pressure possessing a sealed interior in communication with a lower orifice of an upper length of hose having an upper orifice in communication with said supply outlet, said lower orifice being disposed such that drops of aqueous live bacteria inside said drip chamber are visible to observation, and collect in the bottom interior of said chamber which possesses communication with an upper orifice of a lower length of hose, said drip chamber thereby enabling a visual determination of the rate of aqueous live bacteria flow through said closed system.

11. A system for decontaminating water borne human wastes in the holding tank of a self contained convenience facility, said system comprising:

a reservoir of aqueous live bacteria capable of decomposing water borne human wastes into,including solid wastes, olfactorily inoffensive and environmentally benign constituents, said reservoir being held in a supply container possessing a supply outlet connected to a flow metering dévice, an upper length of hose, a lower length of hose and two valves;

each said length of hose possessing a continuous lumen between two orifices, each said orifice comprising an opening of said lumen, one said orifice of said upper length of hose comprising an upper orifice possessing communication with said supply outlet;

said reservoir being disposed elevationally superior to a holding tank containing water borne human wastes and each said valve being operationally connected to at least one said length of hose, each said length of hose, each said valve and said flow metering device together comprising a closed system between said upper orifice of said upper length of hose possessing communication with said supply outlet and a lower orifice of said lower length of hose;

said metering device being disposed elevationally inferior to said supply outlet and elevationally superior to said holding tank, said metering device further comprising a drip chamber possessing walls rigid with respect to atmospheric pressure further possessing a sealed interior in communication with a lower orifice of said upper length of hose disposed such that drips of aqueous live bacteria inside said drip chamber are visible to observation and collect in the bottom interior of said chamber which possesses communication with an upper orifice of said lower length of hose, said drip chamber thereby enabling a visual determination of the rate of aqueous live bacteria flow through said closed system;

placement of said lower orifice of said lower length of hose into communication with the interior of said holding tank and control of each said valve in accordance with a determination of a suitable flow rate of aqueous live bacteria enabled by said metering device thereby enabling gravity induced delivery of aqueous live bacteria from said reservoir in a continuous laminar flow through said closed system to said interior of said holding tank thereby effecting decontamination of the water borne human wastes contained therein by decomposition of said wastes into olfactorily inoffensive and environmentally benign constituents by the live aqueous bacteria so delivered.

12. A system for decontaminating water borne human wastes in the holding tank of a self contained convenience facility in accordance with claim 11 wherein said supply container is sealed except for said supply outlet and said container is collapsible by the evacuation of fluid contents in opposition to atmospheric pressure.

13. A system for decontaminating water borne human wastes in the holding tank of a self contained convenience facility in accordance with claim 11 wherein said supply container is rigid with respect to atmospheric pressure and further possesses an air inlet.

14. A system for decontaminating water borne human wastes in the holding tank of a self contained convenience facility in accordance with claim 11 wherein one said valve comprises an upper valve disposed above said drip chamber and the other said valve comprises a lower valve disposed below said drip chamber.

15. A system for decontaminating water borne human wastes in the holding tank of a self contained convenience facility in accordance with claim 14 wherein said lower valve consists of a constriction device.

16. A system for decontaminating water borne human wastes in the holding tank of a self contained convenience facility in accordance with claim 15 wherein said constriction device is comprised of a frame and a knurled wheel held in said frame.

17. A system for decontaminating water borne human wastes in the holding tank of a self contained convenience facility in accordance with claim 14 wherein said upper valve possesses communication with said supply outlet.

18. A system for decontaminating water borne human wastes in the holding tank of a self contained convenience facility in accordance with claim 17 wherein said upper valve comprises a spigot.

19. A system for decontaminating water borne human wastes in the holding tank of a self contained convenience facility in accordance with claim 18 wherein said spigot is threaded onto said supply outlet.

20. A system for decontaminating water borne human wastes in the holding tank of a self contained convenience facility in accordance with claim 19 wherein said spigot is comprised of a spigot body, a threaded collar and a bored rotatable member possessing a handle.

* * * * *